United States Patent [19]
Cipriani

[11] Patent Number: 5,881,851
[45] Date of Patent: Mar. 16, 1999

[54] SUSPENSION FOR AN OVERHEAD ELECTRIFICATION PLANT FOR RAILWAY LINES OR SIMILAR

[75] Inventor: Alfredo Cipriani, Guidonia, Italy

[73] Assignee: Alstom Transport Electrification, Rome, Italy

[21] Appl. No.: 896,677

[22] Filed: Jul. 18, 1997

[30] Foreign Application Priority Data

Jul. 26, 1996 [IT] Italy .................................. SV96A0024

[51] Int. Cl.⁶ .................................................. B60M 5/00
[52] U.S. Cl. ........................................................... 191/41
[58] Field of Search .................... 191/33 R, 40, 191/41, 42

[56] References Cited

U.S. PATENT DOCUMENTS

| | | | |
|---|---|---|---|
| 418,704 | 1/1890 | Duggan | 191/40 |
| 803,215 | 10/1905 | Davis et al. | 191/41 |
| 942,143 | 12/1909 | Kando | 191/41 |
| 946,135 | 1/1910 | Kando | 191/41 |
| 1,150,067 | 8/1915 | Schaake | 191/41 |
| 1,653,855 | 12/1927 | Holzel . | |
| 5,380,961 | 1/1995 | Ronning et al. | 191/41 |

FOREIGN PATENT DOCUMENTS

| | | | |
|---|---|---|---|
| 0406840 | 1/1991 | European Pat. Off. . | |
| 703330 | 3/1942 | Germany . | |
| 756552 | 12/1953 | Germany . | |
| 57-186531 | 11/1982 | Japan | 191/40 |

*Primary Examiner*—Mark T. Le
*Attorney, Agent, or Firm*—James Creighton Wray; Meera P. Narasimhan

[57] ABSTRACT

An overhead electrification plant for railway lines, or similar, comprises at least one electric wire (9), the so-called contact wire, to power an engine, extending in a predetermined position along the railway line, and being held up by a plurality of suspension elements (3) arranged at predetermined intervals. The suspension elements (3) are at least partially composed of complex metal structures (4, 6, 7, 8) in the form of a polygon, and supported by fixed lateral standards (1) so as to project therefrom. In at least some sections of the track (B), the suspensions have equal and constant geometries, i.e. the suspension elements (3) are similar in the geometrical sense, whereas the only variable is the different overall transverse extension of the suspension elements (3) in the different points of the railway track (B).

17 Claims, 6 Drawing Sheets

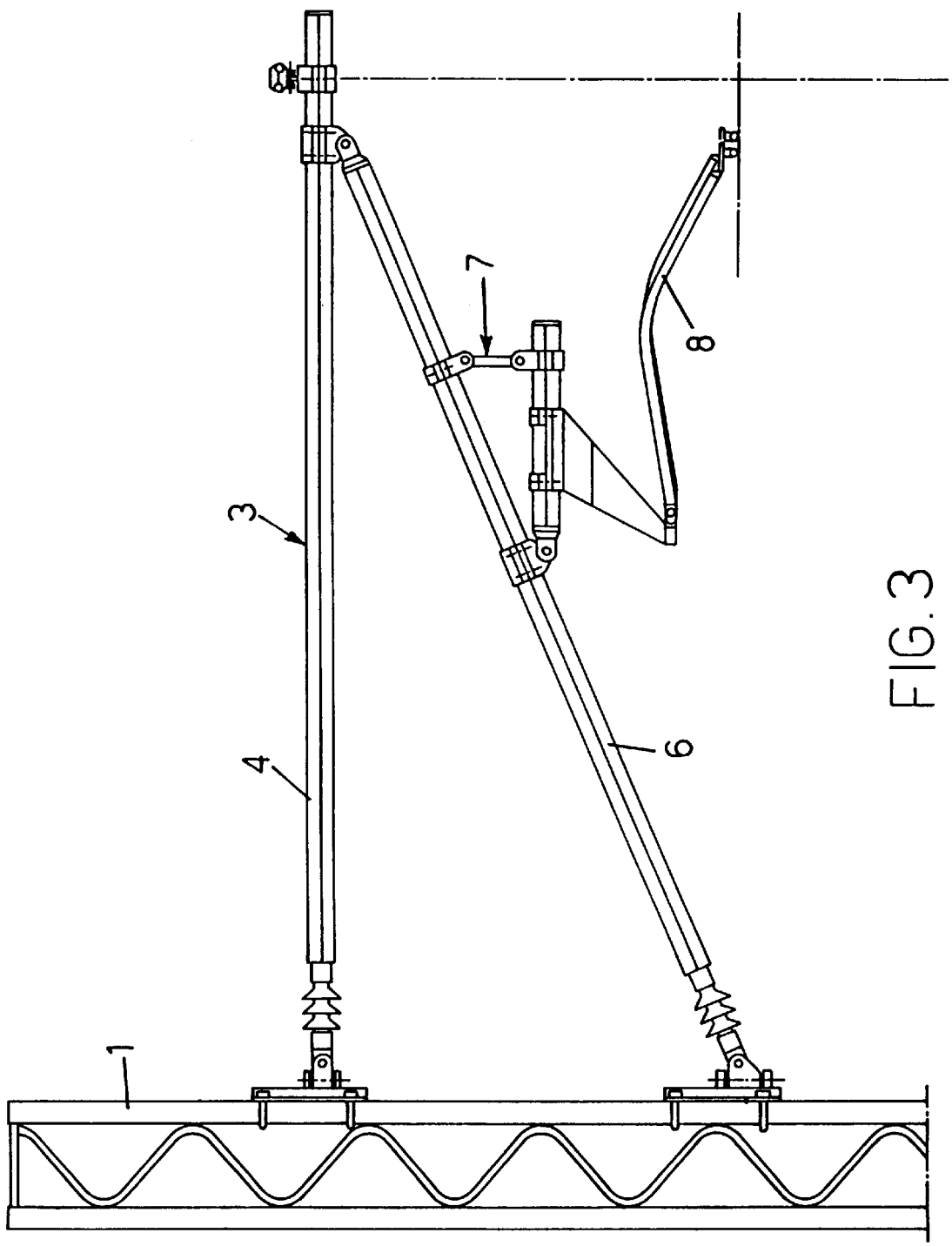

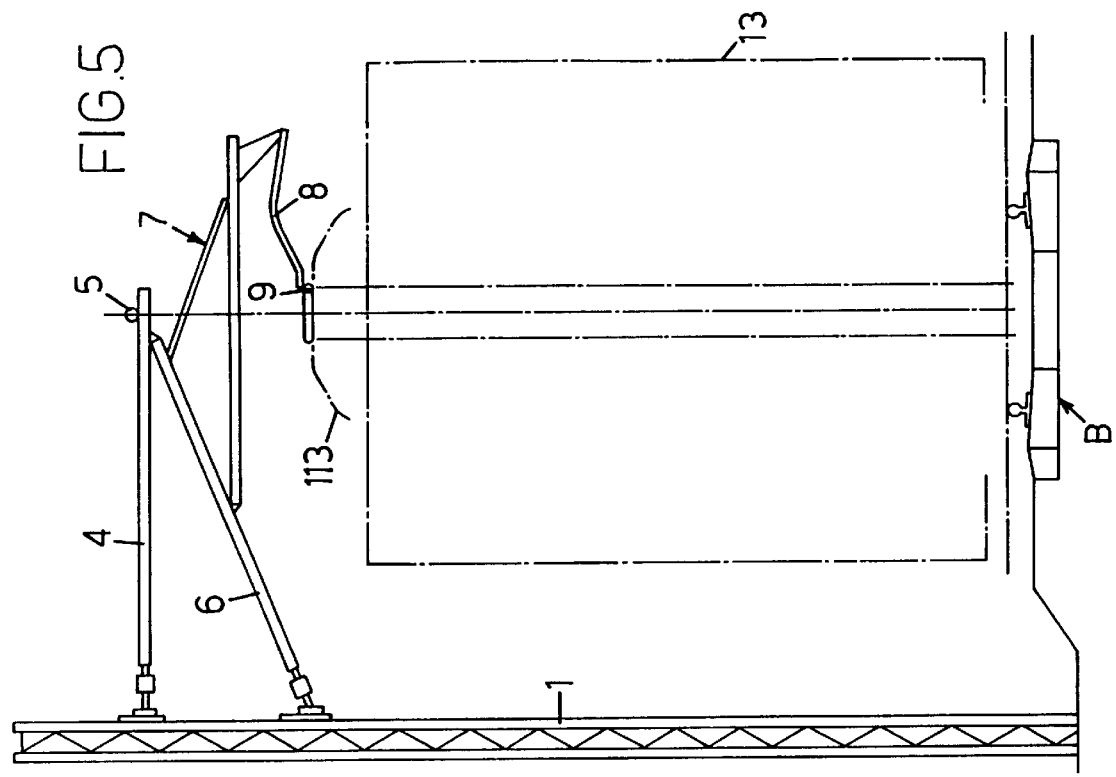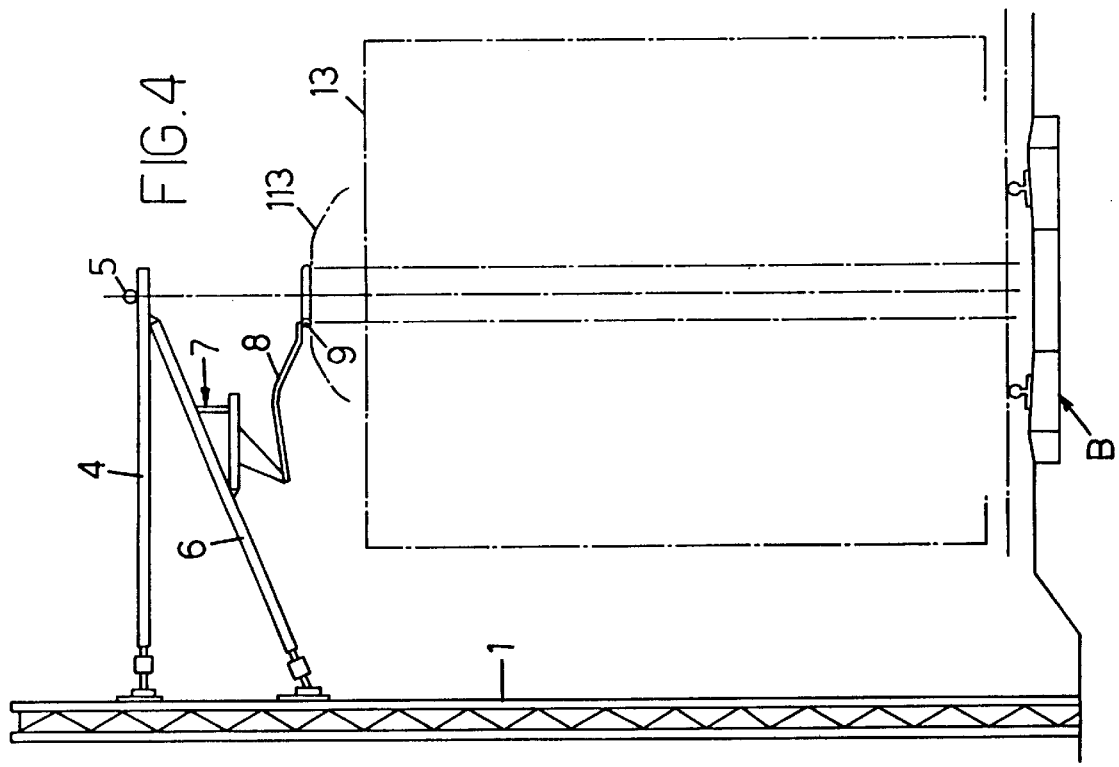

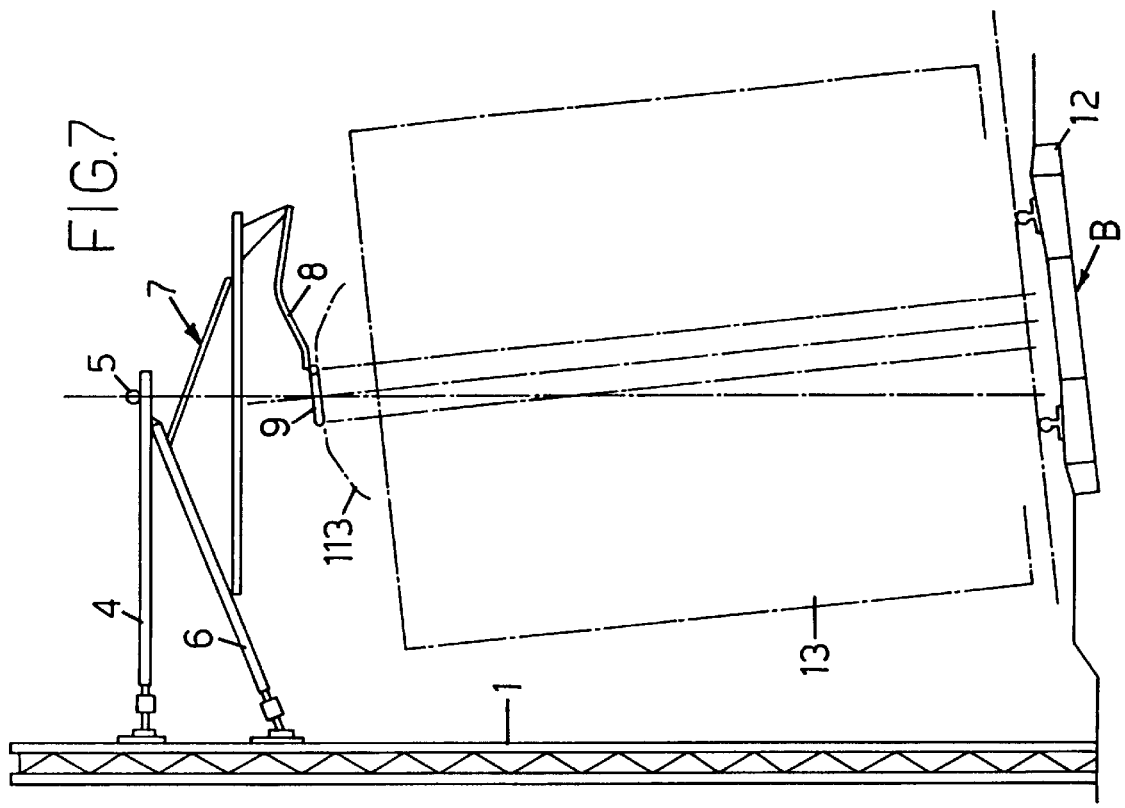
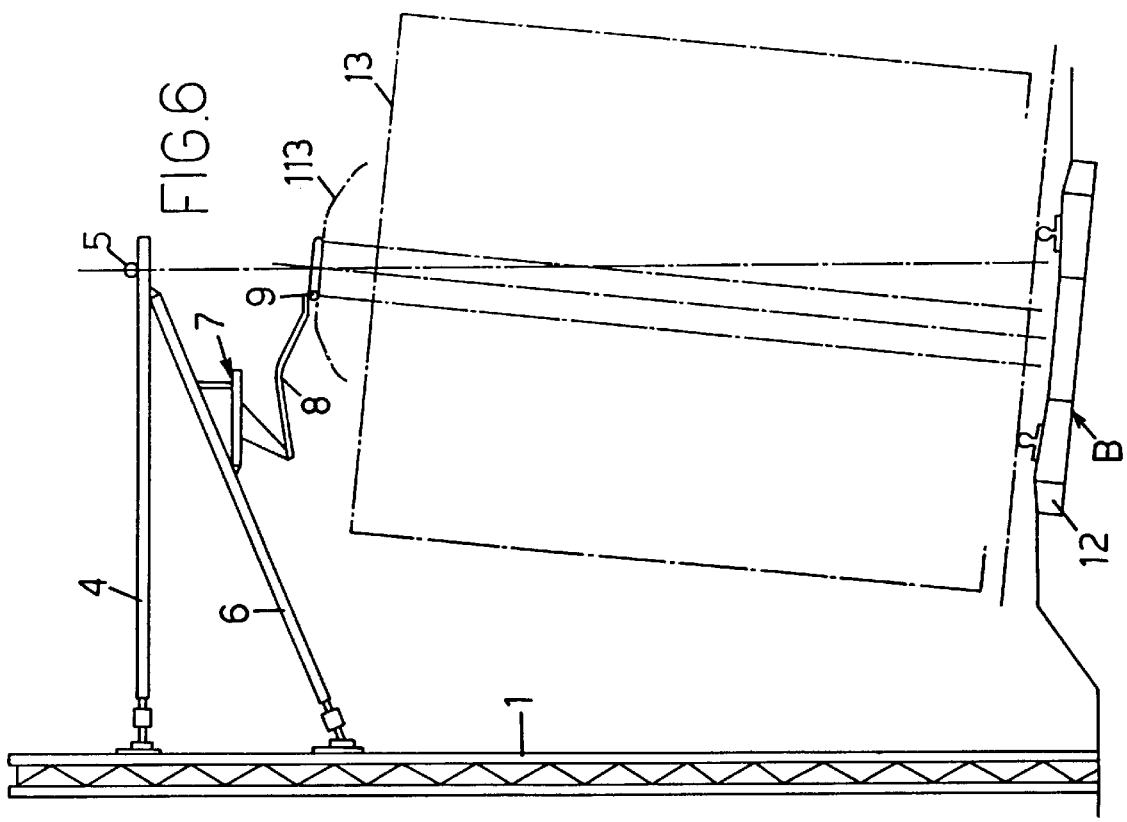

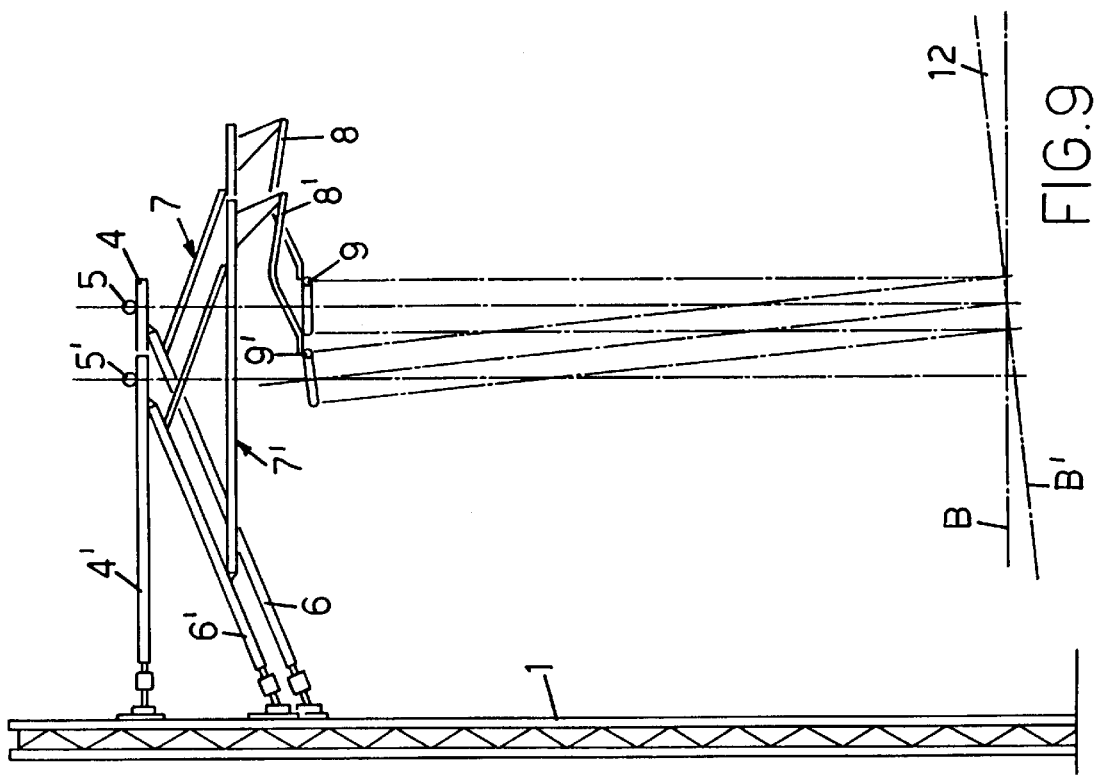
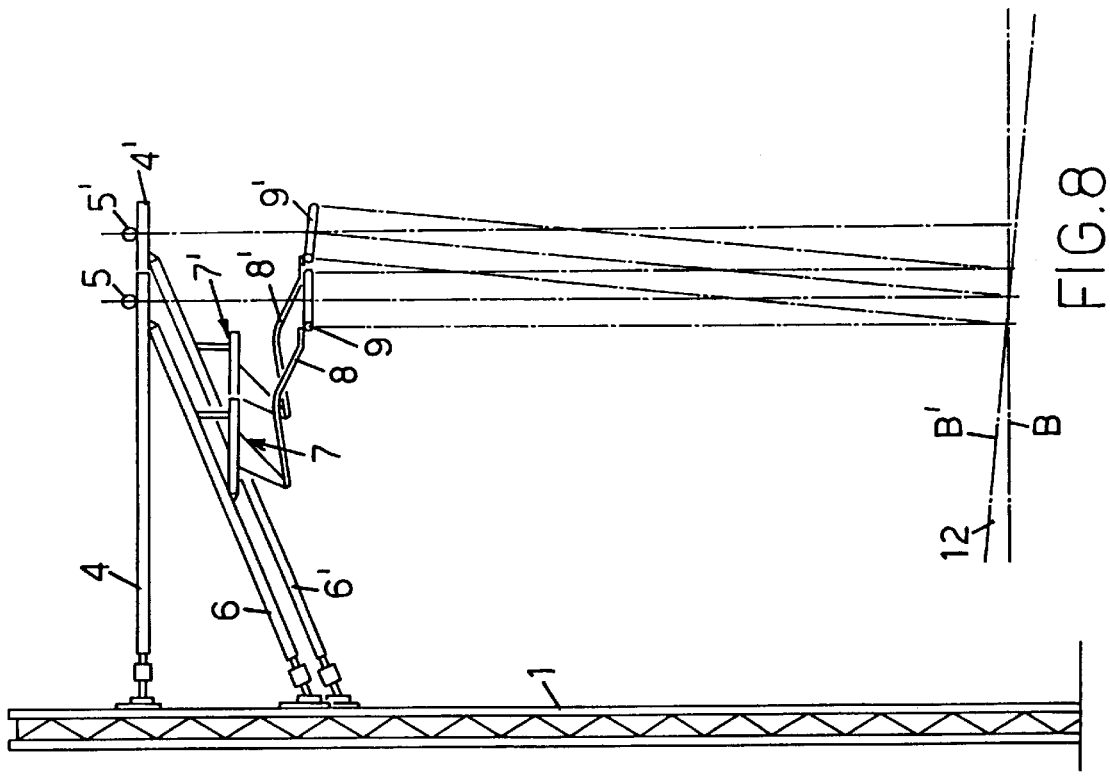

SUSPENSION FOR AN OVERHEAD ELECTRIFICATION PLANT FOR RAILWAY LINES OR SIMILAR

BACKGROUND OF THE INVENTION

The invention relates to an overhead electrification plant for railway lines, or similar, of the type comprising at least one upper messenger cable, suspending a lower exposed electrical wire, the so-called contact wire, which is meant to make contact with electrical connections associated to engines, the so-called pantographs, the said contact wire extending in a predetermined position along the railway line, preferably above its tracks, and being supported by a plurality of suspension elements arranged at predetermined intervals along the railway line, and the said suspensions being composed, at least partially, of complex metal structures supported by fixed lateral supports, such as walls, poles, tunnel vaults, or similar, so as to project therefrom, and the suspension elements consisting of metal longitudinal elements connected to each other in a fixed and/or articulated manner, in such a way as to form a polygon.

The construction of overhead electrification plants, besides encountering the difficulties which arise from electric problems, and from the types of materials used to ensure the best functionality and a sufficient life and safety, also implies typical construction problems, arising form the need of quick and cheap purchase of material and assembly.

The suspensions are generally assembled on site, and their geometries must be adapted to the position of the contact wire with respect to the track of the railway line. These geometries are currently varied according to local needs, that is according to their local position with respect to the track. This requires a considerable number of different parts, and thus a higher care by the assembly staff, to respect the different geometries.

The varying configurations of the suspension elements are not only due to the possible different distances of their fixed supports from the track, but especially to the necessary superelevation of the outer side of the track with respect to the inner side, on curves, which makes the central point of the pantograph to be transversely staggered with respect to the vertical passing through the projection of the track axis.

The invention is intended to provide an overhead electrification plant for railway lines, or similar, of the type described hereinbefore which, thanks to simple and cheap expedients, involves a reduction of planning and engineering costs, material purchasing costs, and installation costs, besides faster installation and assembly procedures.

SUMMARY OF THE INVENTION

The invention achieves the above stated purposes by providing an overhead electrification plant of the type described hereinbefore, in which, in at least some sections of the line, for any point of the extension of the contact wires and of the railway line, the suspensions have equal constant geometries, i.e. the suspension elements are similar in the geometrical sense, whereas the only variable is the different overall transverse extension of the suspension elements in the different points of the railway line.

The datum point for the geometrical construction of the suspension is made to be the point in which the contact wire is to be positioned, according to the engineer's choice, on the vertical plane, transverse to the track in which each suspension element extends.

As the contact wire progresses following a polygonal line, and passes from a suspension to the other of a predetermined ideal path, the invention provides that only the two main elements of the suspension, which hold up the contact wire, are variable, the remaining suspension elements maintaining the same geometry.

With reference to a construction of the suspension elements which comprises an upper tie in the form of a rigid rod, which is carried by the support and by a strut, so as to project and oscillate therefrom, the said strut being also in the form of a rigid rod, and branching off from another point of the support with its free end substantially converging towards the free end of the tie, in such a way as to form a right-angled triangle with constant angles, as well as the so-called braces of polygon for the contact wire and the stems of polygon associated thereto and connected on one side to the brace of polygon and on the other to the contact wire, in any point of at least some partial sections of the line, no change is provided to the angle between the tie rod and the strut, nor to the position of the brace of polygon and of the stems of polygon, whereas the adaptation to the different conditions is achieved by making both the tie rod and the strut longer or shorter on the side for connection to the fixed support.

Moreover, apart from the said length change, the position of the brace of polygon with respect to the suspension end is such that the former is fixed to the strut in the same position for both types of utmost points of reversal of the zigzag progression of the contact wire, the two configurations being referred to in jargon as outstretched and compressed.

The advantages of the invention are self-evident from the above disclosure, the configurations and thus the assembling procedures are always the same in any point of the line, whereas only the length of the tie rods and struts change. This is particularly advantageous when the suspension elements are made of rods connected to each other in a rigid or articulated manner, through coupling or screw fastening means or by clamping or similar. In this case, the rods are only to be cut on site at the predetermined lengths before applying terminals or connecting means thereto.

The geometrical configuration of the suspension is theoretically defined in the design, restricting the possible variables to the lenghts of the tie rod and of the strut and to the position, different but constant in itself, of the suspensions according to the compressed and outstretched polygon configurations. In these two configurations, however, only the position of the brace of polygon and its attachment to the strut change; the characteristics are anyway identical for each configuration.

As for the manufacture of the suspension elements, they can be made of metal, for example aluminium, or similar.

Further improvements of the present invention will form the subject of the dependent claims.

The characteristics of the invention and the advantages derived therefrom will appear with better evidence from the following description of a non limiting example, illustrated in the attached figures, in which:

BRIEF DESCRIPTION OF THE DRAWINGS

FIGS. 2 and 3 are side magnified views of the suspension according to the two configurations.

FIGS. 4 and 5 show a cross section of a railway line with respect to a vertical plane in which a suspension develops for the two compressed and outstretched polygon configurations respectively.

FIGS. 6 and 7 show, like the preceding figures, the two compressed and outstretched configurations of a suspension on a curve.

FIGS. 8 and 9 also show the compressed and outstretched configurations according to the preceding figures in a straight section and in a curve section, both in the same figure.

DETAILED DESCRIPTION OF THE PREFERRED EMBODIMENT

Figure 1:
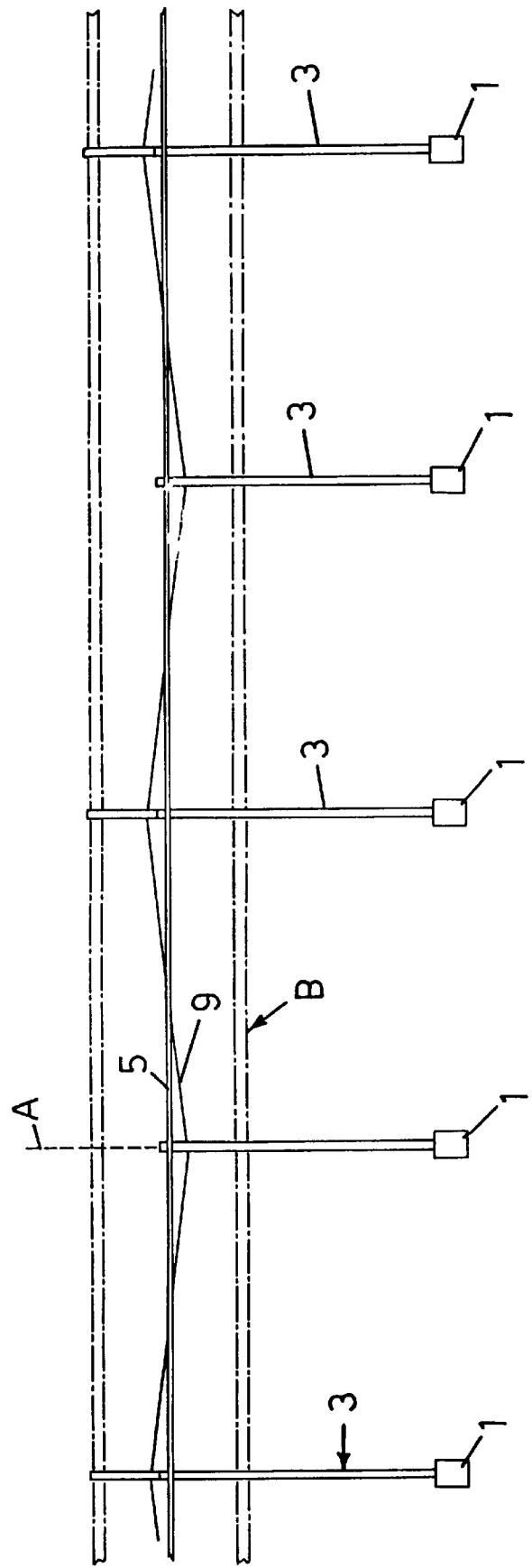
FIG. 1 is a top plan view of a section of railway line with an electrification plant provided with suspensions according to the invention.
Figure 2:
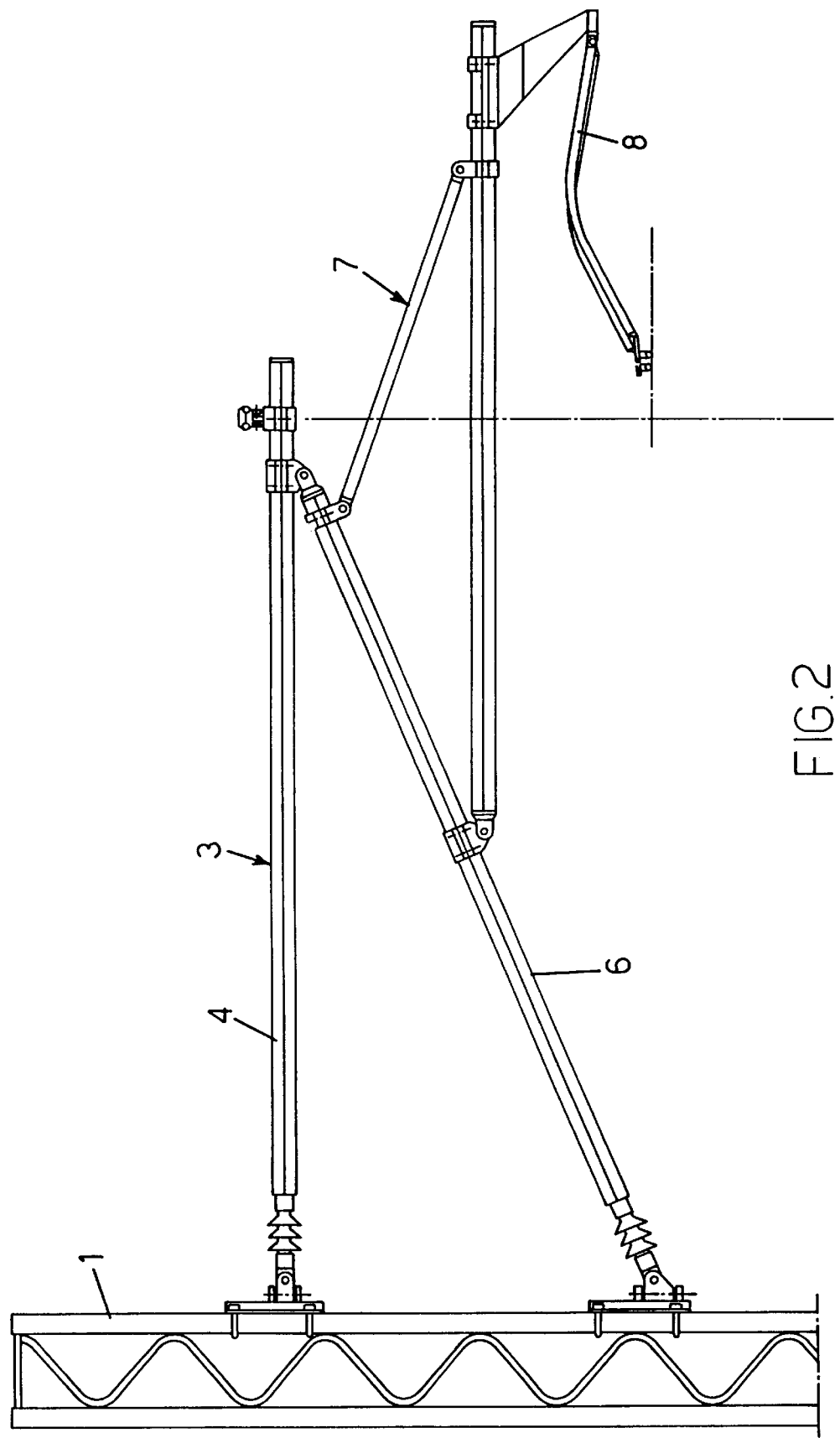

Referring to the figures, an overhead electrification plant for a railway line comprises a plurality of fixed supports 1, distributed along the line. These supports may be poles, walls, or other stationary bearings, not only vertical, like bridge or vault structures, or similar.

Each fixed support 1 bears a suspension element altogether referred to with number 3, extending above and projecting from the track B, and developing in a substantially triangular shape on a vertical plane, perpendicular to the track axis, referred to as A. The suspension is composed of an upper tie rod 4, with a cable 5 fixed thereto, the so-called messenger cable, the said tie rod 4 being connected at its free end, associated with the said messenger cable, to another elongate element, named strut 6, which is inclined downwards towards the fixed support 1 forming a predetermined angle with the tie rod 4, which is substantially horizontal. The tie rod 4 and the strut 6 are connected with their diverging ends to vertically aligned points of the fixed support 1, generally and preferably as to oscillate about a common vertical axis.

In a predetermined position, the strut 6 bears a structure, shaped as a polygon, which projects downwards and consists of rods connected to each other, the so-called brace of polygon. The latter is altogether referred to with number 7 and itself bears on projection another rod 8, the so-called stem of polygon, whose free end is connected to the electric wire 9, designed to make contact with the sliding contact means of the locomotive.

With reference to FIGS. 4 and 5, on straight track, the suspension is configured in such a way that the messenger cable 5 is vertically aligned with the median longitudinal axis of the track, whereas the contact wire 9 at the end of the stem is led on a polygonal path, being laterally staggered with respect to the vertical longitudinal plane which contains the cable, alternately and generally to the same extent, on one side and on the other of the said vertical longitudinal plane. In this way, the contact wire does not interact with only one point of the sliding contact means of the locomotive, preventing an early wear thereof.

This polygonal progression is achieved by providing two configuration types for the suspensions, which remain constant, for the so-called outstretched configuration in which the contact wire is staggered towards the fixed support 1 and the compressed configuration in which the contact wire 9 is laterally staggered in a direction opposite to the fixed support 1.

The two outstretched and compressed configurations only differ as regards the position of the brace of polygon 7 and its connection to the strut 6, whereas the rest of the suspension is identical for both suspension elements. In the curve sections of the railway line, as shown in FIGS. 6 to 9, the track B has the outer side 12 superelevated to a certain extent with respect to the inner side. In these conditions, the engine 13 is laterally inclined to the same extent as the superelevation, and therefore the contact point, or, more precisely, the contact strip of the engine means 113 for sliding contact with the contact wire are in a laterally staggered position towards the inner side of the curve as compared to the position taken on straight sections. Therefore, on curves, the median longitudinal axis about which the polygonal path of the contact wire 9 extends must be also moved accordingly, towards the inner side of the curve in such a way as to interact again with the central strip of the sliding contact means of the engine. The messenger cable too, which is vertically aligned to the median longitudinal axis of the polygonal path of the contact wire is staggered towards the inner side of the curve to the same extent as the contact wire. As FIGS. 6 and 7, and particularly FIGS. 8 and 9 evidently show, this staggering is obtained, by simply making the tie rod 4' and the strut 6' of the suspension elements accordingly shorter on curve sections. The rest of the geometry of the two compressed and outstretched configurations of the suspension elements remains unchanged, in a perfectly congruent manner or at least in a similarity relationship in the geometrical sense. The unchanged elements are therefore the angle between the tie rod and the strut, the braces of polygon and the stems of polygon, as well as the relative positions between contact wire and messenger cable.

In FIGS. 6 to 9, the parts of the suspension are referred to as 4', 6', 7', 8' and the messenger cable and the contact wire as 5' and 9'.

By this arrangement, the assembling procedures are made to be notably simpler and faster, and considerable saving as regards material purchase and costs is obtained.

In a construction of the suspension elements providing longitudinal elements for tie rods and struts connected by means of collars or other types of couplings and a plurality of rods of a predetermined size for the construction of the steady braces of polygon, the construction changes are only the longer or shorter tie rods and struts, whereas the means for mutual fixing, the elements for fixing to the lateral supports 1, the braces of polygon and the stems of polygon remain the same, as well as the points of attachment of the means for coupling the tie rod and the strut, of the means for connection to the messenger cable, of the means for connection to the contact wire and of the braces of polygon to the rest of the suspension.

The tie rods and the struts are advantageously cut to size from pre-shaped bars made of the chosen material, there being fixed thereto the means for mutual connection and those for clamping the messenger cable and the contact wire.

Naturally, the invention is not limited to the embodiments described and illustrated hereinbefore, but may be greatly varied, particularly as regards construction. Therefore, for example, the lateral supports of the suspension elements may be of any type, and the elements, as well as their construction may also be of any type. Particularly, the fixed supports of the suspension elements may consist of vertical or substantially vertical rods, which are fixed as hanging from bridge structures or tunnel vaults, or similar, or may consist of frameworks with a vertical element therein, steadily fixed to and projecting from natural walls. All this without departure from the guiding principle disclosed above and claimed below.

I claim:

1. An overhead electrification plant for a railway line, comprising:

at least one exposed contact wire for making contact with pantographs on engines traveling along the railway line, the at least one contact wire extending in a predetermined length of the railway line;

a plurality of suspension elements arranged at predetermined intervals along the length of the railway line for suspending the at least one contact wire, each of the suspension elements comprising first and second elongated structures connected to each other to form a suspension structure having a forward portion and a rearward portion;

a plurality of lateral supports supporting the suspension elements, the rearward portions of the suspension structures being connected to the supports;

a plurality of bracing polygons connected to the forward portions of the suspension structures; and the forward portions of the suspension structures together with corresponding ones of the bracing polygons, that are disposed along the length of the railway line, forming first and second alternatively arranged suspension assemblies, the first suspension assemblies having the same configuration and dimensions, the second suspension assemblies having the same configurations and dimensions, and the rearward portions of the suspension structures, that are disposed along curved sections of the railway line, having variations of lengths.

2. The plant of claim 1, further comprising a predetermined position for the contact wire, said position being a datum point for positioning the suspension elements and the contact wire, the datum point being on a vertical plane transverse to the railways lines along which each suspension element extends at a point of intersection between the contact wire and the vertical plane transverse to the railway lines, the point corresponding to a position of a sliding contact means of an engine on the railway lines.

3. The plant of claim 2, wherein the contact wire is in a progressive polygonal line forming a zigzag symmetrically with respect to a median longitudinal axis, the axis being coincidental with a predetermined axis of the sliding contact means of the engine, and said first and second suspension assemblies having first and second configurations for suspending the contact wire alternately on first and second sides of the longitudinal axis.

4. The plant of claim 3, wherein the forward portions of the suspension assemblies are substantially identical.

5. The plant of claim 3, wherein the first and second suspension assemblies have at least some corresponding parts with substantially identical geometries.

6. The plant of claim 3, wherein the first and second configurations are outstretched and compressed configurations, respectively.

7. The plant of claim 1, wherein each suspension element comprises a tie forming the first elongated element and being connected to the support at one position, a strut forming the second elongated element and connecting the tie to another position of the support to project and oscillate therefrom, a free end of the strut converging proximal a free end of the tie, wherein the tie and strut together form a right-angled triangle with constant angles.

8. The plant of claim 7, wherein each of the bracing polygons has plural braces connected to the strut for supporting the contact wire.

9. The plant of claim 8, further comprising at least one stem brace interconnecting the wire and at least one of said braces.

10. The plant of claim 8, wherein the braces are attached at a predetermined position to the strut.

11. The plant of claim 8, wherein angles between the tie and the strut are constant, and positions of the braces are constant along the length of the railway line, and wherein the lengths of the ties and struts are varied along the length of the railway line.

12. The plant of claim 7, wherein the tie is formed as a rigid rod.

13. The plant of claim 7, wherein the strut is formed as a rigid rod.

14. The plant of claim 8, wherein the braces are formed as rod-like elements.

15. The plant of claim 8, wherein positions of the braces relative to an end of each of the suspension elements are constant for at least one of the first and second suspension assemblies.

16. The plant of claim 8, wherein the brace polygons of the first and second suspension assemblies have different configurations.

17. The plant of claim 7, wherein the ties and struts of the suspension elements, along the length of the railway line, have same angles therebetween.

* * * * *